(12) United States Patent
Jia et al.

(10) Patent No.: US 9,077,404 B2
(45) Date of Patent: Jul. 7, 2015

(54) COORDINATING METHOD AND DEVICE FOR MULTI-INPUT MULTI-OUTPUT PRECODING OF DOWNLINK MULTI-BASE STATION

(75) Inventors: Xiaoshan Jia, Shenzhen (CN); Dengkui Zhu, Shenzhen (CN); Yanfeng Guan, Shenzhen (CN); Dihao Ning, Shenzhen (CN); Zhaohua Lu, Shenzhen (CN); Huahua Xiao, Shenzhen (CN); Xiaoxiao Jiao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 190 days.

(21) Appl. No.: 13/989,753

(22) PCT Filed: Jun. 21, 2011

(86) PCT No.: PCT/CN2011/076026
§ 371 (c)(1),
(2), (4) Date: May 24, 2013

(87) PCT Pub. No.: WO2012/092755
PCT Pub. Date: Jul. 12, 2012

(65) Prior Publication Data
US 2013/0235842 A1  Sep. 12, 2013

(30) Foreign Application Priority Data
Jan. 6, 2011 (CN) .......................... 2011 1 0001783

(51) Int. Cl.
*H04B 7/04* (2006.01)
*H04B 7/02* (2006.01)
(Continued)

(52) U.S. Cl.
CPC .............. *H04B 7/0456* (2013.01); *H04B 7/024* (2013.01); *H04B 7/0639* (2013.01); *H04W 72/08* (2013.01);
(Continued)

(58) Field of Classification Search
None
See application file for complete search history.

(56) References Cited

U.S. PATENT DOCUMENTS

2009/0052405 A1* 2/2009 Ko et al. ................ 370/335
2011/0034192 A1 2/2011 Lim et al.
(Continued)

FOREIGN PATENT DOCUMENTS

CN 101316156 A 12/2008
CN 101400139 A 4/2009
(Continued)

OTHER PUBLICATIONS

International Search Report in international application No. PCT/CN2011/076026, mailed on Oct. 20, 2011.
(Continued)

*Primary Examiner* — Charles C Jiang
*Assistant Examiner* — George Atkins, Jr.
(74) *Attorney, Agent, or Firm* — Oppedahl Patent Law Firm LLC (57) ABSTRACT

The disclosure discloses a method for coordinating downlink MIMO precoding among multiple BSs, including that: each BS first performs independent resource allocation to allocate resources to users of each BS, then receives PMI information fed back by a time-frequency resource block occupying MS in a respective cell, wherein the PMI information includes optimal and recommended or restrained PMIs corresponding to an MS; adjacent BSs perform information interaction with each other to acquire PMI information of MSs occupying the same time-frequency resource block in adjacent cells; and it is determined whether there is any conflict between MSs occupying the same time-frequency resource block in adjacent cells according to PMI information fed back by an MS in the current cell and interaction information from adjacent BSs, and a new PM is generated in a corresponding manner. The disclosure also discloses a device for implementing the method. The coordinating method and device of the disclosure can reduce or eliminate interference among users at a border through downlink resource allocation and precoding coordination between adjacent cells, thereby enhancing performance of the entire network.

7 Claims, 7 Drawing Sheets (51) Int. Cl.
*H04J 11/00* (2006.01)
*H04L 5/00* (2006.01)
*H04B 7/06* (2006.01)
*H04W 72/08* (2009.01)

(52) U.S. Cl.
CPC .......... *H04J 11/0059* (2013.01); *H04L 5/0035* (2013.01); *H04L 5/0073* (2013.01); *H04L 5/0023* (2013.01); *H04L 5/0037* (2013.01); *H04L 5/0092* (2013.01)

(56) References Cited

U.S. PATENT DOCUMENTS

| 2011/0038436 | A1 | 2/2011 | Kim et al. | |
|---|---|---|---|---|
| 2011/0105164 | A1* | 5/2011 | Lim et al. | 455/501 |
| 2012/0021738 | A1* | 1/2012 | Koo et al. | 455/422.1 |
| 2012/0021753 | A1* | 1/2012 | Damnjanovic et al. | 455/450 |

FOREIGN PATENT DOCUMENTS

| CN | 102065434 A | 5/2011 |
|---|---|---|
| WO | 2007123029 A1 | 11/2007 |
| WO | 2009120048 A2 | 10/2009 |
| WO | 2009136736 A2 | 11/2009 |

OTHER PUBLICATIONS

English Translation of the Written Opinion of the International Search Authority in international application No. PCT/CN2011/076026, mailed on Oct. 20, 2011.

* cited by examiner

COORDINATING METHOD AND DEVICE FOR MULTI-INPUT MULTI-OUTPUT PRECODING OF DOWNLINK MULTI-BASE STATION

TECHNICAL FIELD

The disclosure relates to the field of wireless communication techniques, and in particular to a method and device for coordinating downlink Multiple Input Multiple Output (MIMO) precoding among multiple base stations (BS).

BACKGROUND

Techniques of employing multiple antennas at both the transmitter and the receiver to enhance system performance, namely, the MIMO techniques, have been widely applied in various wireless communication systems of 3G/B3G/4G ($3^{rd}$ Generation/Beyond $3^{rd}$ Generation/$4^{th}$ Generation). After extending traditional Shannon information theory to MIMO channels, there has been a tremendous enhancement in channel capacity, showing potential huge gain of the MIMO system. Before transmitting data from an antenna, it is required to perform MIMO precoding on the data. Precoding is a technology for preprocessing the signal to be transmitted using Channel-side Information at the Transmitter (CSIT) to obtain gain in a certain kind of performance. A Coordinated Multiple Points (COMP) transmission solution, capable of taking full advantage of the MIMO techniques to reduce interference in a wireless communication network and enhancing efficiency through close coordination of multiple access points signal transmission and reception, has become the key technical point in current OFDM (Orthogonal Frequency Division Multiplexing)-MIMO and has a strong prospect of application.

In a current cell wireless communication network, same frequency interference between adjacent cells is one of the most prominent factors causing performance declination, which in particular tends to hugely affect the performance of users at the edge of cells. Existing methods for reducing interference to users at the edge of adjacent cells are generally divided into three types, namely, interference randomization, interference elimination, and interference coordination; Wherein, the interference randomization technique is mainly used to randomize an interference signal and actually can not reduce interference; The interference elimination technique is intended to suppress interference by acquiring gain at a Mobile Station (MS) via signal processing techniques, which generally can only eliminate the major interference; While the interference coordination technique minimizes inter-cell interference by coordinating the precoding and resources among multiple cells.

The multi-BS MIMO technique is one of the aforementioned interference coordination techniques, and refers to a technique in which an MS in an OFDM/OFDMA (Orthogonal Frequency Division Multiple Access) system measures channel information between the MS itself and the serving BS, and feeds back a Precoding Matrix Indicator (PMI) which quantizes the channel information; measures channel information between the MS itself and a BS for an adjacent cell, and feeds back a restrained or recommended set of PMIs according to indication of the BS; and then a new Precoding Matrix for each MS is acquired by coordination among the BSs. This however can not eliminate interference among users at the border of adjacent cells.

Therefore, it is urgent to provide an improved method and device for coordinating downlink MIMO precoding among multiple BSs, to overcome the aforementioned defects.

SUMMARY

In view of the above, the technical problem to be solved by the present disclosure is to provide a method and device for coordinating downlink MIMO precoding among multiple BSs, which can reduce or eliminate interference to edge users through downlink resource allocation and precoding coordination between adjacent cells, thereby enhancing performance of the entire wireless communication network.

In order to solve the aforementioned technical problem, the present disclosure provides a method for coordinating downlink Multiple Input Multiple Output (MIMO) precoding among multiple base stations (BS), including the steps of:

receiving Precoding Matrix Indicator (PMI) information fed back by a Mobile Station (MS) occupying a time-frequency resource block in each cell, wherein the PMI information comprises an optimal and a recommended or restrained PMI associated with the MS;

performing, by a BS, information interaction with an adjacent BS to acquire PMI information of an MS occupying the same time-frequency resource block in an adjacent cell; and determining whether there is any conflict between the MSs occupying the same time-frequency resource block in the current and adjacent cells according to the PMI information fed back by the MS in the current cell and interaction information from the adjacent BS, and generating a new Precoding Matrix (PM) in a corresponding manner.

Specifically, the step of determining whether there is any conflict between the MSs occupying the same time-frequency resource block in the current and adjacent cells according to the PMI information fed back by the MS in the current cell and interaction information from the adjacent BS may include: determining whether there is any overlap between the recommended PMIs in the PMI information fed back by the MS in the current cell and the restrained PMI of the MS occupying the same time-frequency resource block in the adjacent cell, determining that there is a conflict when there is an overlap, otherwise determining that there is no conflict.

Furthermore, the step of determining whether there is any conflict between the MSs occupying the same time-frequency resource block in the current and adjacent cells according to the PMI information fed back by the MS in the current cell and interaction information from the adjacent BS, and generating a new Precoding Matrix (PM) in a corresponding manner may include:

when there is a conflict between the MSs occupying the same time-frequency resource block in the current and adjacent cells, generating a new Precoding Matrix W according to formula 1 or formula 2, wherein the formula 1 is:

$$W = \alpha W_{PMI_1} + (1-\alpha)(1 - W_{PMI_2} W_{PMI_2}^H) W_{PMI_1},$$

wherein $\alpha \in [0,1]$, $W_{PMI_1}$ indicates a code word column vector corresponding to $PMI_1$, $W_{PMI_2}^H$ indicates conjugate transposition of a code word column vector corresponding to $PMI_2'$, and $PMI_1$ and $PMI_2'$ are optimal PMIs of the MSs occupying the same time-frequency resource block in the current and adjacent cells, respectively; and the formula 2 is:

$$W = \arg\max_{\substack{PMI_{1,i} \in PMI_{1s} \\ PMI_{2,j} \in PMI_{2s}}} (|PMI_1^H PMI_{2,j}| + |PMI_2^H PMI_{1,i}|),$$

wherein $PMI_1$ and $PMI_2$ are optimal PMIs of the MSs occupying the same time-frequency resource block in the current and adjacent cells, respectively, $PMI_{1s}$ and $PMI_{2s}$ are sets of recommended PMIs for different MSs, and $PMI_1^H$ is conjugate transposition of the code word column vector corresponding to $PMI_1$.

Moreover, the step of determining whether there is any conflict between the MSs occupying the same time-frequency resource block in the current and adjacent cells according to the PMI information fed back by the MS in the current cell and interaction information from the adjacent BS, and generating a new Precoding Matrix (PM) in a corresponding manner may further include: when there is no conflict between the MSs occupying the same time-frequency resource block in the current and adjacent cells, generating the new Precoding Matrix according to the formula 1.

Preferably, α may have a value that is inversely proportional to channel correlation between the MSs occupying the same time-frequency resource block in the current and adjacent cells.

Preferably, the method may further include: when there is a conflict between the MSs occupying the same time-frequency resource block in the current and adjacent cells, before generating the new Precoding Matrix according to formula 1 or formula 2, determining whether the optimal PMI in the PMI information fed back by the MS in the current cell and the optimal PMIs of the MSs occupying the same time-frequency resource block in the adjacent cell are the same, and re-performing, by the current and adjacent BSs, resource allocation when they are the same.

Furthermore, the method may further include: adjusting, by the BS, a Modulation and Coding Scheme (MCS) according to the new PM.

Moreover, the step of adjusting, by the BS, a Modulation and Coding Scheme (MCS) according to the new PM may specifically include:

calculating, by the BS, a Signal to Noise Ratio (SNR) according to a formula $$SNR = \frac{\|HW\|_F^2 s^2}{\sigma^2},$$

and acquiring, by the BS, the MCS according to the calculated SNR, wherein $\sigma^2$ is noise power, $s^2$ is signal power, $\|\bullet\|_F$ is F norm, H is a channel matrix between the BS and the MS, and W is the new PM.

Furthermore, the method may further include: before the step of receiving Precoding Matrix Indicator (PMI) information fed back by a Mobile Station (MS) occupying a time-frequency resource block in each cell, performing independently, by each BS, resource allocation to allocate time-frequency resource blocks to MSs in its respective cell.

The disclosure further provides a device for coordinating downlink Multiple Input Multiple Output (MIMO) precoding among multiple base stations (BS), including a Precoding Matrix Indicator (PMI) receiving unit, an inter-BS information interaction unit, and a Precoding Matrix (PM) generating unit, wherein the PMI receiving unit is configured to receive PMI information fed back by a Mobile Station (MS), wherein the PMI information comprises an optimal PMI and a recommended or restrained PMI of a serving Base station (BS) associated with the MS of the BS; the inter-BS information interaction unit is configured to perform, by a BS, information interaction with an adjacent BS to acquire PMI information of an MS occupying the same time-frequency resource block in an adjacent cell; and the PM generating unit is configured to determine whether there is any conflict between the MSs occupying the same time-frequency resource block in the current and adjacent cells according to the PMI information fed back by the MS in the current cell and received by the PMI receiving unit and interaction information acquired by the inter-BS information interaction unit, and generating a PM in a corresponding manner.

Preferably, the coordinating device may further include a Modulation and Coding Scheme (MCS) adjusting and operating unit configured to adjust an MCS according to the PM generated by the PM generating unit.

Furthermore, the PM generating unit may include a conflict determining subunit and a PM generating subunit, wherein the conflict determining subunit is configured to determine whether there is any overlap between the recommended PMI in the PMI information fed back by the MS in the current cell and the restrained PMI of the MS occupying the same time-frequency resource block in the adjacent cell, determining that there is a conflict when there is an overlap, otherwise determining that there is no conflict; and the PM generating subunit is configured to select a corresponding formula to generate the new PM according to a result determined by the conflict determining unit.

The method and device for coordinating downlink MIMO precoding among multiple BSs of the disclosure reduces or eliminates interference to edge users through downlink resource allocation and precoding coordination between adjacent cells in a radio communication network, and can thereby enhance performance of the entire network effectively.

DETAILED DESCRIPTION

The disclosure provides a method and device for coordinating downlink MIMO precoding among multiple BSs, capable of reducing or eliminating interference to edge users through downlink resource allocation and precoding coordination between adjacent cells, thereby enhancing performance of the entire wireless communication network.

To further clarify the technical solution of the present disclosure, further description is made below with reference to the figures.

Figure 1:
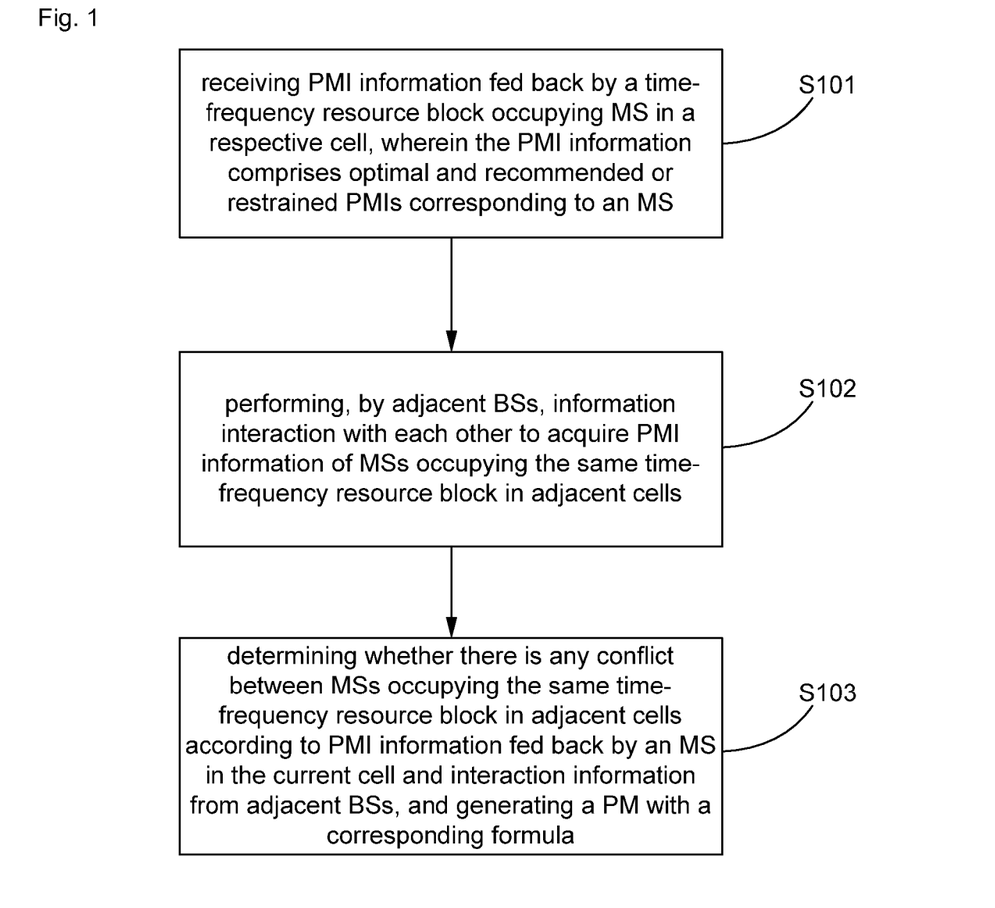
FIG. 1 is the flowchart of embodiment 1 of the method for coordinating downlink MIMO precoding among multiple BSs according to the present disclosure.

FIG. 1 is the flowchart of embodiment 1 of the method for coordinating downlink MIMO precoding among multiple BSs according to the present disclosure. The method for coordinating downlink MIMO precoding among multiple BSs of this embodiment includes the following steps.

Figure 2:
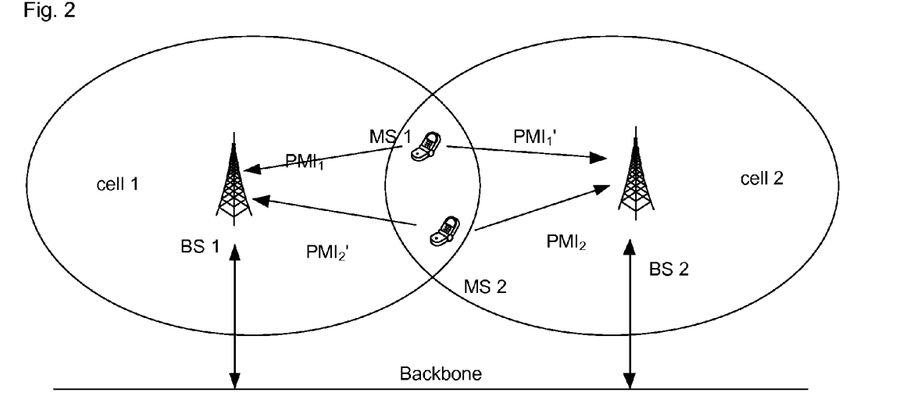
FIG. 2 is the schematic view of the network structure when BSs perform coordinating using the method for coordinating downlink MIMO precoding among multiple BSs shown in FIG. 1.

S101: PMI information fed back by an MS occupying time-frequency resource block in each cell is received, wherein the PMI information comprises optimal and recommended or restrained PMIs corresponding to an MS. The recommended PMIs refer to PMIs that the MS wants a coordinating BS to use, while the restrained PMIs refer to PMIs that the MS does not want a coordinating BS to use. Specifically, BSs BS1 and BS2 receive PMI information fed back by MSs MS1 and MS2 of the respective cells of BS1 and BS2; In FIG. 2, $PMI_1$ indicates PMI information fed back to BS1 by MS1, $PMI_1'$ indicates PMI information fed back to BS2 by MS1, $PMI_2$ indicates PMI information fed back to BS2 by MS2, and $PMI_2'$ indicates PMI information fed back to BS1 by MS2.

S102: adjacent BSs perform information interaction with each other to acquire PMI information of MSs occupying the same time-frequency resource block in adjacent cells.

For each resource block coordinated using multiple BSs, as shown in FIG. 2, BS1 transmits restrained PMIs corresponding to an MS scheduled on the resource block to BS2 of an adjacent cell, and meanwhile BS2 transmits restrained PMIs corresponding to an MS scheduled on the resource block to BS1. Furthermore, information interaction can be performed via a Backbone or an interface between BSs and the like.

S103: it is determined whether there is any conflict between MSs occupying the same time-frequency resource block in adjacent cells according to PMI information fed back by an MS in the current cell and interaction information from an adjacent BS, and a new Precoding Matrix (PM) is generated in a corresponding manner.

Specifically, it can be determined whether there is any conflict between MSs occupying the same time-frequency resource block in adjacent cells by determining whether there is any overlap between optimal PMIs in PMI information fed back by an MS in the current cell and restrained PMIs of an MS occupying the same time-frequency resource block in an adjacent cell, wherein it indicates occurrence of a conflict when there is an overlap, otherwise it indicates no occurrence of any conflict. It is described below by example how to determine whether there is any conflict between MSs occupying the same time-frequency resource block in adjacent cells.

Figure 3:
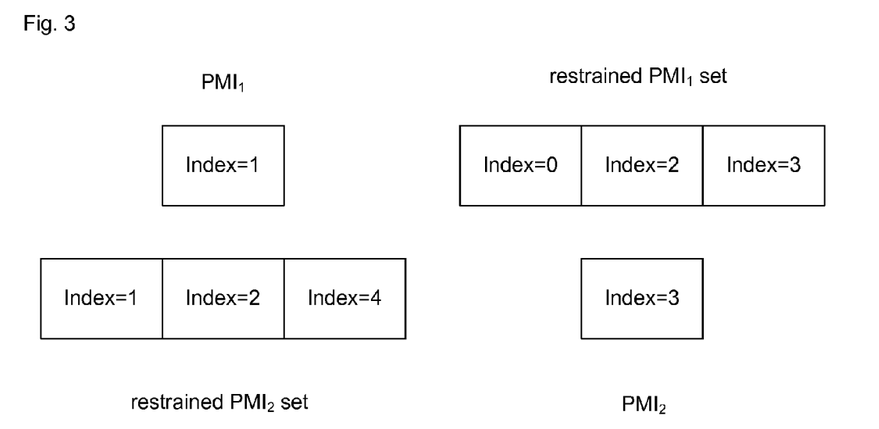
FIG. 3 is the schematic view of the PMI when there is a conflict between MSs occupying the same time-frequency resource block.

As shown in FIG. 3, an optimal PMI Index suited to and fed back by MS1 is 1, and Indices of a restrained PMI set fed back by MS1 are 0, 2, and 3, respectively; Meanwhile, an optimal PMI Index suited to and fed back by MS2 occupying the same time-frequency resource block as MS1 is 3, and Indices of a restrained PMI set fed back by MS2 are 1, 2, and 4. It can be seen that the optimal PMI of MS1 is in the restrained PMI set of MS2, and the optimal PMI of MS2 is in the restrained PMI set of MS1, namely, there is an overlap between the optimal PMIs in PMI information fed back by an MS in the current cell and restrained PMIs of an MS occupying the same time-frequency block in an adjacent cell, in which case, MS1 and MS2 has large channel correlation for respective serving BSs of MS1 and MS2, and strong interference will result if aforementioned respective optimal code word column vectors of MS1 and MS2 are used directly, which will affect communicating quality; therefore, there will be a conflict between MS1 and MS2.

Figure 4:
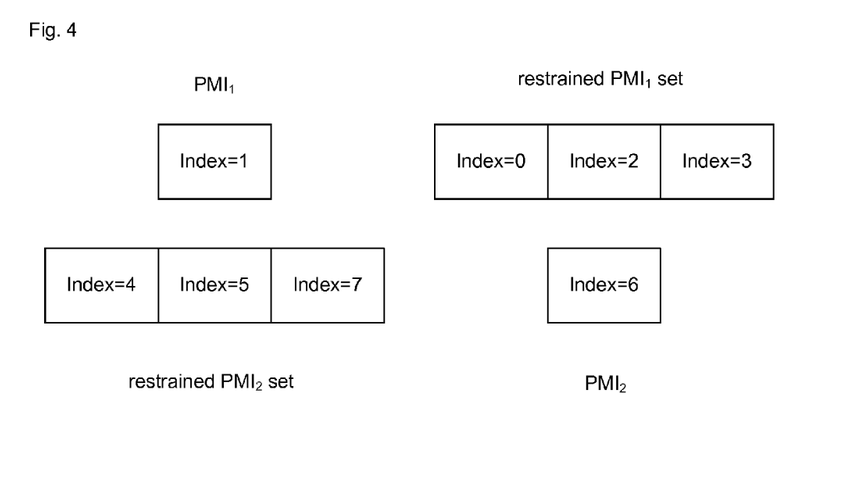
FIG. 4 is the schematic view of the PMI when there is no conflict between MSs occupying the same time-frequency resource block.

As shown in FIG. 4, an optimal PMI Index suited to and fed back by MS1 is 1, and Indices of a restrained PMI set fed back by MS1 are 0, 2, and 3, respectively; Meanwhile, an optimal PMI Index suited to and fed back by MS2 occupying the same time-frequency resource block as MS1 is 6, and Indices of a restrained PMI set fed back by MS2 are 4, 5, and 7. It can be seen that the optimal PMI of MS1 is not in the restrained PMI set of MS2, nor is the optimal PMI of MS2 in the restrained PMI set of MS1, in which case, MS1 and MS2 has little channel correlation for respective serving BSs of MS1 and MS2; therefore, there will be no conflict between MS1 and MS2.

When there is a conflict between MS1 and MS2, formula 1 or formula 2 may be selected depending on the circumstance, to generate a Precoding Matrix W corresponding to MS1. Moreover, when the network is heavily loaded, that is, there are many users with severe interference, and it is required to accurately calculate a new PM, then formula 1 is selected; and when the network is not so heavily loaded and user conflict is not so severe, then formula 2 is selected as the solution.

Said formula 1 is:

$$W = \alpha W_{PMI_1} + (1-\alpha)(1 - W_{PMI_2'}W_{PMI_2'}^H)W_{PMI_1},$$

Figure 5:
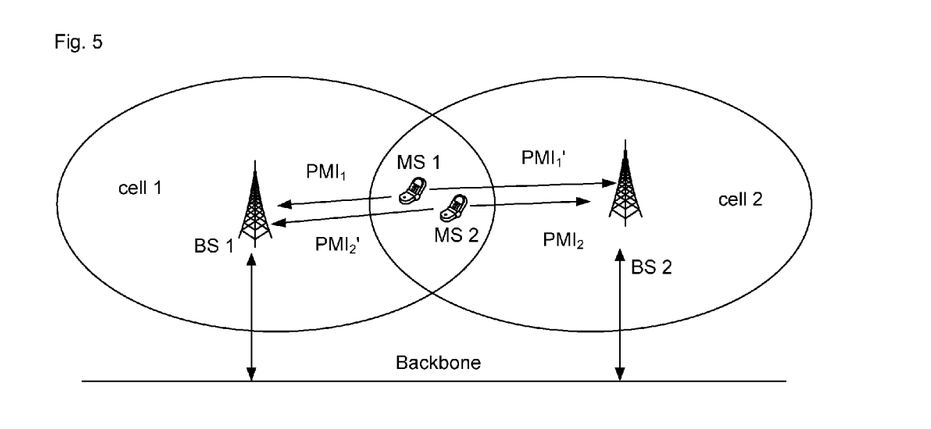
FIG. 5 is the schematic view of the network structure when BSs perform coordinating using the method for coordinating downlink MIMO precoding among multiple BSs shown in FIG. 1 and α takes a small value.
Figure 6:
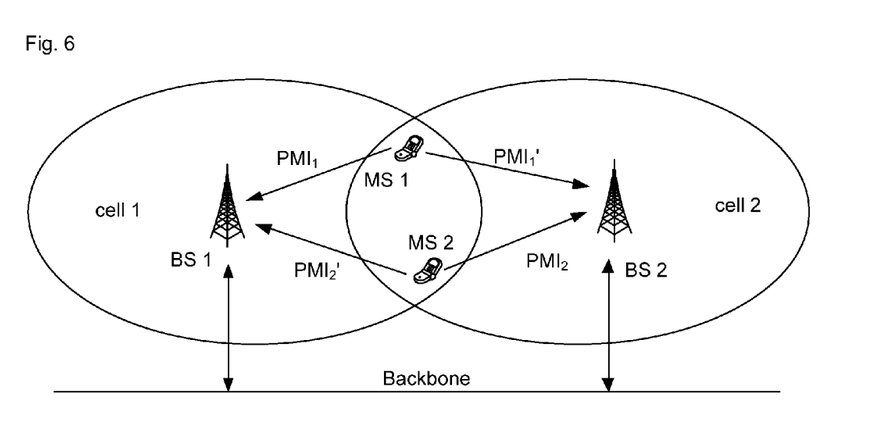
FIG. 6 is the schematic view of the network structure when BSs perform coordinating using the method for coordinating downlink MIMO precoding among multiple BSs shown in FIG. 1 and α takes a large value.

Wherein, $\alpha \in [0,1]$, which represents resemblance of W and $PMI_1$, $W_{PMI_1}$ indicates a code word column vector corresponding to $PMI_1$, $W_{PMI_2'}^H$ indicates conjugate transposition of a code word column vector corresponding to $PMI_2'$, and $PMI_1$ and $PMI_2'$ are optimal PMIs of MSs occupying the same time-frequency resource block in adjacent cells; α takes a value that is inversely proportional to channel correlation between MS1 and MS2; The higher the correlation, the lower the α value is, and vice versa. When locations of MS1 and MS2 occupying the same time-frequency resource block are close to each other, as shown in FIG. 5, when BS1 and BS2 transmit data, interference of BS1 to MS2 and that of BS2 to MS1 will both be severe, that is, channel correlation between MS1 and MS2 is high, in which case the α is set to a relatively small value, possibly about 0.5. In this way, a wave beam directed by BS1 to MS1 and one directed by BS2 to MS2 can be staggered, to reduce interference by a BS to users at the edge of an adjacent cell. Meanwhile, when MS1 and MS2 occupying the same time-frequency resource block are relatively far from each other, as shown in FIG. 6, when BS1 and BS2 transmit data, neither interference of BS1 to MS2 nor that of BS2 to MS1 will be too severe, that is, channel correlation between MS1 and MS2 is low, in which case the α is set to a relatively large value, for example about 0.8, or more. In this way, the transmission from BS1 to MS1 and from BS2 to MS2 can be ensured without causing large interference at the same time.

The formula 2 is:

$$W = \arg\max_{\substack{PMI_{1,i} \in PMI_{1s} \\ PMI_{2,j} \in PMI_{2s}}} (|PMI_1^H PMI_{2,j}| + |PMI_2^H PMI_{1,i}|),$$

wherein $PMI_1$ and $PMI_2$ are optimal PMIs of MSs occupying the same time-frequency resource block in adjacent cells, $PMI_{1s}$ and $PMI_{2s}$ are sets of recommended PMIs of different MSs, and $PMI_1^H$ is conjugate transposition of a code word column vector corresponding to $PMI_1$.

When there is no conflict between MS1 and MS2, a Precoding Matrix W may be generated according to the formula 1. In this case, PMI information reported by MS1 and MS2 located at the cell edge and occupying the same time-frequency resource block shows that the channel from MS1 to BS1 and that from MS2 to BS2 have little correlation or are nearly orthogonal to each other, both interference of BS1 to MS1 and that of BS2 to MS1 are very small, and α may be 1.

Clearly, the PM of MS2 is calculated at BS2 according to the same method as aforementioned.

The method for coordinating downlink MIMO precoding among multiple BSs of this embodiment reduces or eliminates interference among users at a border through downlink resource allocation and precoding coordination between adjacent cells in a radio communication network, and can enhance performance of the entire network.

Figure 7:
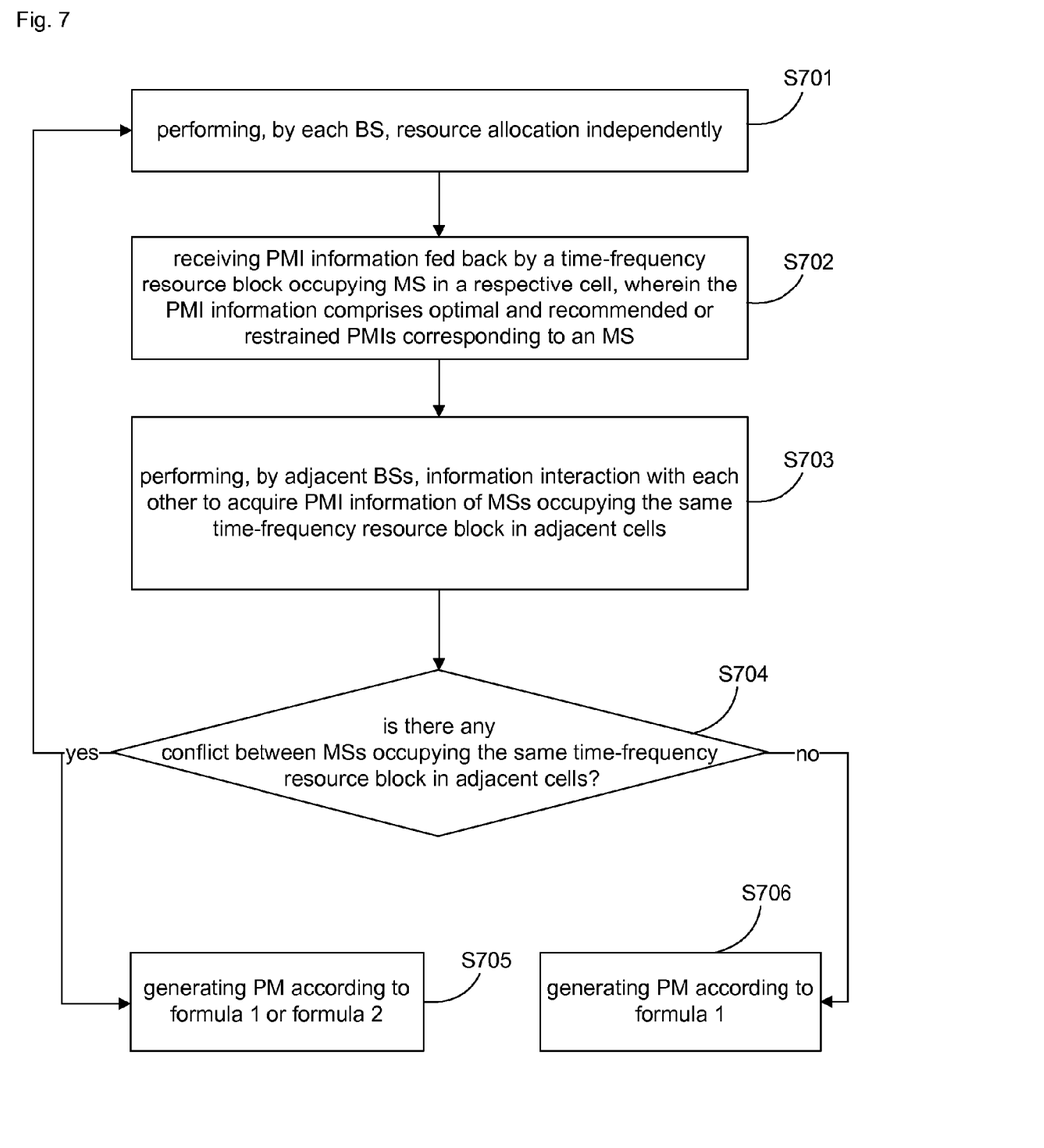
FIG. 7 is the flowchart of embodiment 2 of the method for coordinating downlink MIMO precoding among multiple BSs according to the present disclosure.

FIG. 7 is the flowchart of embodiment 2 of the method for coordinating downlink MIMO precoding among multiple BSs according to the present disclosure; As shown in FIG. 7, the method for coordinating downlink MIMO precoding among multiple BSs of embodiment 2 includes the following steps.

S701: each BS performs resource allocation independently to allocate time-frequency resource blocks to MSs in each cell. The aforementioned two dimensional time-frequency resource block includes multiple continuous OFDM/OFDMA symbols in time, and multiple continuous subcarriers in frequency domain, said subcarriers configured to carry data and frequency guiding signals corresponding to a receiver.

S702: each BS receives PMI information fed back by a time-frequency resource block occupying MS in a respective cell, wherein the PMI information comprises optimal and recommended or restrained PMIs corresponding to an MS. The recommended PMIs refer to PMIs that the MS wants a coordinating BS to use, while the restrained PMIs refer to PMIs that the MS does not want a coordinating BS to use.

S703: adjacent BSs perform information interaction with each other to acquire PMI information of MSs occupying the same time-frequency resource block in adjacent cells.

S704: it is determined whether there is any conflict between MSs occupying the same time-frequency resource block in adjacent cells according to PMI information fed back by an MS in the current cell and interaction information from adjacent BSs; The method goes to S701 or S705 if there is a conflict, otherwise (namely when optimal PMIs of the two are orthogonal) to S706, until a PM is generated. Furthermore, when there is a conflict, it is determined whether optimal PMIs in PMI information fed back by an MS in the current cell and optimal PMIs of MSs occupying the same time-frequency resource block in adjacent cells are the same; If so, the method goes to S701, and resource allocation is reperformed; Otherwise, the method goes to S705.

S705: formula 1 or formula 2 is selected to generate a PM. Moreover, when the network is heavily loaded, that is, there are many users with severe interference, and it is required to accurately calculate a new PM, then formula 1 is selected; and when the network is not so heavily loaded and user conflict is not so severe, then formula 2 is selected as the solution.

S706: a PM is generated according to the formula 1, with a in this case taken as 1.

Note that steps S702 to S704 may repeat multiple times in case there is a conflict between MSs occupying the same time-frequency block in adjacent cells, until a PM is generated. steps S702 to S703 in this embodiment are the same as steps S101 to S102, S705 and S706 generating a PM are the same as S104 in embodiment 1, and the detailed description is thereby omitted here.

The method for coordinating downlink MIMO precoding among multiple BSs of this embodiment reduces or eliminates interference among users at a border through downlink resource allocation and precoding coordination between adjacent cells in a radio communication network, and can enhance performance of the entire network.

Figure 8:
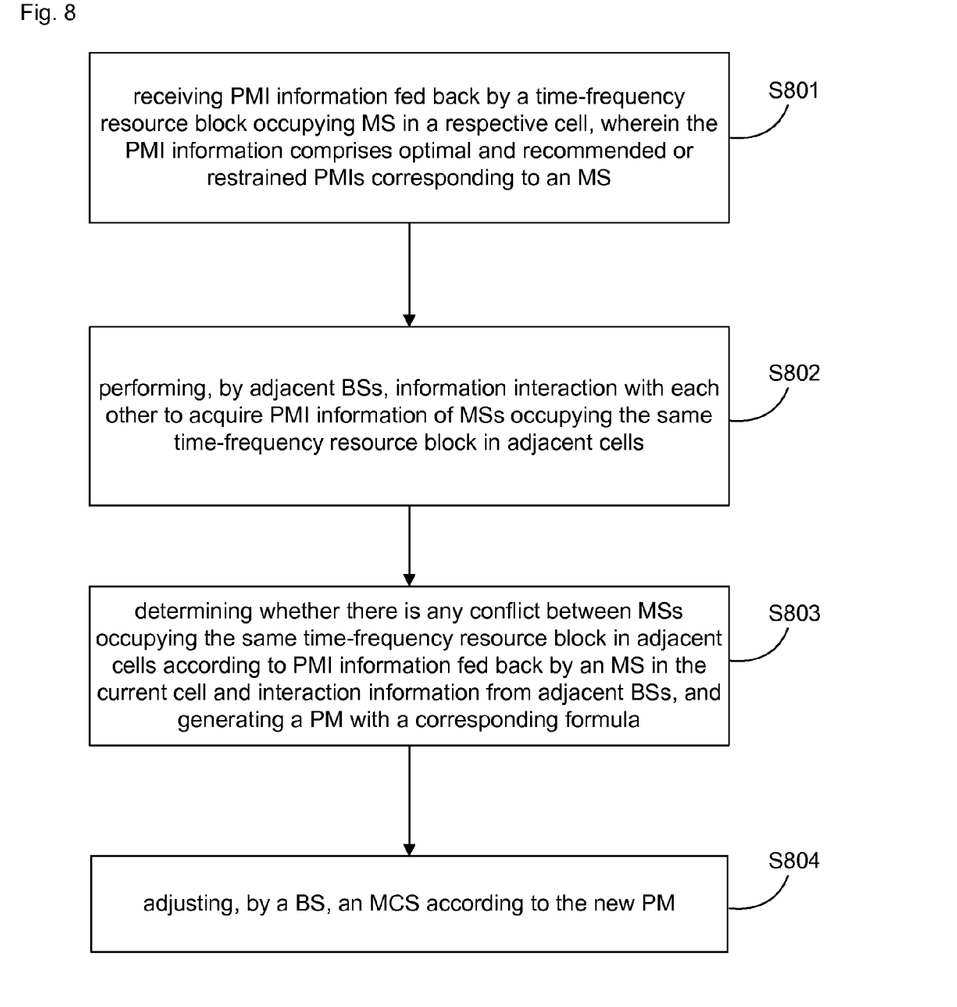
FIG. 8 is the flowchart of embodiment 3 of the method for coordinating downlink MIMO precoding among multiple BSs according to the present disclosure.

FIG. 8 is the flowchart of embodiment 3 of the method for coordinating downlink MIMO precoding among multiple BSs according to the present disclosure; As shown in FIG. 8, steps S801 to S804 of the method for coordinating downlink MIMO precoding among multiple BSs of embodiment 3 are the same as steps S101 to S104 of the method for coordinating downlink MIMO precoding among multiple BSs of embodiment 1, and detailed description is omitted here. The method for coordinating downlink MIMO precoding among multiple BSs of embodiment 3 also include S805: a BS adjusts a Modulation and Coding Scheme (MCS) according to the new PM.

Furthermore, a BS calculates a Signal to Noise Ratio (SNR) according to a formula $$SNR = \frac{\|HW\|_F^2 S^2}{\sigma^2},$$

and looks up a table to acquire a Modulation and Coding Scheme (MCS) according to the SNR calculated, wherein $\sigma^2$ is noise power, $s^2$ is signal power, $\|\bullet\|_F$ calculates F norm, H is a channel matrix between the BS and an MS, and W is the new PM.

Figure 9:
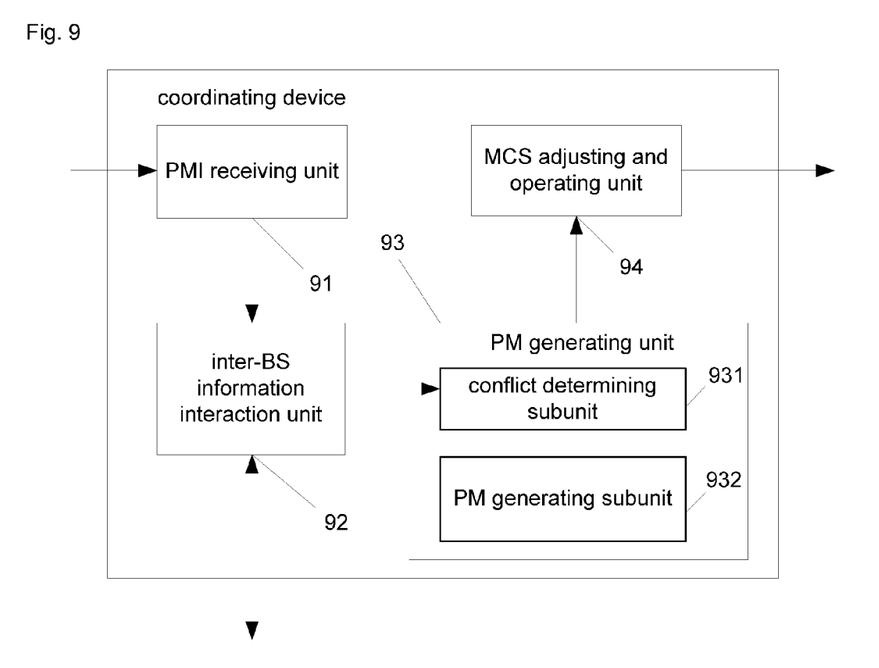
FIG. 9 is the schematic view of the structure of an embodiment of the device for coordinating downlink MIMO precoding among multiple BSs according to the present disclosure.

FIG. 9 is the schematic view of the structure of an embodiment of the device for coordinating downlink MIMO precoding among multiple BSs according to the present disclosure. As shown in FIG. 9, the device for coordinating downlink MIMO precoding among multiple BSs of this embodiment includes a PMI receiving unit 91, an inter-BS information interaction unit 92, and a PM generating unit 93, wherein the PMI receiving unit 91 is configured to receive PMI information fed back by a time-frequency resource block occupying MS in a respective cell, wherein the PMI information includes optimal and recommended or restrained PMIs of a serving BS corresponding to an MS of the BS; the inter-BS information interaction unit 92 is configured to perform, by adjacent BSs, information interaction with each other to acquire PMI information of MSs occupying the same time-frequency resource block in adjacent cells; and the PM generating unit 93 is configured to determine whether there is any conflict between MSs occupying the same time-frequency resource block in adjacent cells according to PMI information fed back by an MS in the current cell received by the PMI receiving unit 91 and interaction information acquired by the inter-BS information interaction unit 92, and generating a PM in a corresponding manner.

Moreover, the PM generating unit 93 includes: a conflict determining subunit 931 and a PM generating subunit 932, wherein the conflict determining subunit 931 is configured to determine whether there is any overlap between recommended PMIs in PMI information fed back by an MS in the current cell and restrained PMIs of an MS occupying the same time-frequency resource block in an adjacent cell, wherein it indicates occurrence of a conflict when there is an overlap, otherwise it indicates no occurrence of any conflict; and the PM generating subunit 932 is configured to select a corresponding formula to generate a PM according to a result determined by the conflict determining unit.

Moreover, the device for coordinating downlink MIMO precoding among multiple BSs of this embodiment further includes an MCS adjusting and operating unit 94 configured to adjust an MCS according to the PM generated by the PM generating unit 93.

The method and device for coordinating downlink MIMO precoding among multiple BSs of this embodiment reduces or eliminates interference among users at a border through downlink resource allocation and precoding coordination between adjacent cells in a radio communication network, and can thereby enhance performance of the entire network effectively.

What described above are merely preferred embodiments of the disclosure and thus are not intended to limit the patent scope of the disclosure; and any equivalent alteration to the structure or the flow made using content of the description and figures of the disclosure, or direct or indirect application to other related technical fields is likewise included in the patent scope of the disclosure.

The invention claimed is:

1. A method for coordinating downlink Multiple Input Multiple Output (MIMO) precoding among multiple base stations (BS), comprising:
   Receiving, by a first BS, Precoding Matrix Indicator (PMI) information fed back by a first Mobile Station (MS) occupying a time-frequency resource block in a first cell managed by the first BS, wherein the PMI information fed back by the first MS comprises an optimal PMI and a recommended or restrained PMI associated with the first MS;
   receiving, by a second BS adjacent to the first BS, PMI information fed back by a second MS occupying the same time-frequency resource block in a second cell adjacent to the first cell, wherein the second cell is managed by the second BS, and the PMI information fed back by the second MS comprises an optimal PMI and a recommended or restrained PMI associated with the second MS;
   performing, by the first BS, PMI information exchange with the second BS to acquire the PMI information fed back by the second MS;
   Determining, by the first BS, whether there is any conflict between the first MS and the second MS according to the PMI information fed back by the first MS and the PMI information fed back by the second MS acquired from the second BS, and generating a new Precoding Matrix (PM) according to the result of the determination;
   adjusting, by the first BS, a Modulation and Coding Scheme (MCS) according to the new PM by: calculating a Signal to Noise Ratio (SNR) according to a formula $$SNR = \frac{\|HW\|_F^2 s^2}{\sigma^2},$$

and acquiring the MCS according to the calculated SNR, wherein $\sigma^2$ is noise power, $s^2$ is signal power, $\|\cdot\|_F$ is F norm, H is a channel matrix between the BS and the MS, and W is the new PM.

2. The method according to claim 1, wherein the step of determining, by the first BS, whether there is any conflict between the first MS and the second MS according to the PMI information fed back by the first MS and the PMI information fed back by the second MS acquired from the second BS comprises:
   determining whether there is any overlap between the recommended PMI in the PMI information fed back by the first MS and the restrained PMI of the second MS, determining that there is a conflict when there is an overlap, otherwise determining that there is no conflict.

3. The method according to claim 1, wherein the step of determining, by the first BS, whether there is any conflict between the first MS and the second MS according to the PMI information fed back by the first MS and the PMI information fed back by the second MS acquired from the second BS, and generating a new Precoding Matrix (PM) according to the result of the determination comprises:
   when there is a conflict between the first MS and the second MS, generating a new Precoding Matrix W according to formula 1 or formula 2, wherein
   the formula 1 is:

$$W = \alpha W_{PMI_1} + (1-\alpha)(1 - W_{PMI_2'} W_{PMI_2'}^H) W_{PMI_1},$$

wherein $\alpha \in [0,1]$, $W_{PMI_1}$ indicates a code word column vector corresponding to $PMI_1$, $W_{PMI_2'}^H$ indicates conjugate transposition of a code word column vector corresponding to $PMI_2'$, and $PMI_1$ and $PMI_2'$ are optimal PMIs of the first MS and the second MS, respectively; and
   the formula 2 is:

$$W = \arg\max_{\substack{PMI_{1,i} \in PMI_{1s} \\ PMI_{2,j} \in PMI_{2s}}} (|PMI_1^H PMI_{2,j}| + |PMI_2^H PMI_{1,i}|),$$

wherein $PMI_S$ and $PMI_2$ are optimal PMIs of the first MS and the second MS, respectively, $PMI_{1s}$ and $PMI_{2s}$ are sets of recommended PMIs for the first MS and the second MS, respectively, and $PMI_1^H$ is conjugate transposition of the code word column vector corresponding to $PMI_1$.

4. The method according to claim 3, wherein the step of determining, by the first BS, whether there is any conflict between the first MS and the second MS according to the PMI information fed back by the first MS and the PMI information fed back by the second MS acquired from the second BS, and generating a new Precoding Matrix (PM) according to the result of the determination further comprises: when there is no conflict between the first MS and the second MS, generating the new Precoding Matrix according to the formula 1.

5. The method according to claim 3, wherein the $\alpha$ has a value that is inversely proportional to channel correlation between the first MS and the second MS.

6. The method according to claim 3, further comprising: when there is a conflict between the first MS and the second MS, before generating the new Precoding Matrix according to formula 1 or formula 2, determining whether the optimal PMI in the PMI information fed back by the first MS and the optimal PMI of the second MS are the same, and re-performing, by the first BS and the second BS, resource allocation when they are the same.

7. The method according to claim 1, further comprising: before the step of receiving the PMI information fed back respectively by the first MS and the second MS, performing independently, by each of the first BS and the second BS, resource allocation to allocate time-frequency resource blocks to MSs served in its respective cell.

* * * * *